Aug. 18, 1936.  A. H. OELKERS ET AL  2,051,648
TRUCK
Filed Sept. 8, 1931   3 Sheets-Sheet 2
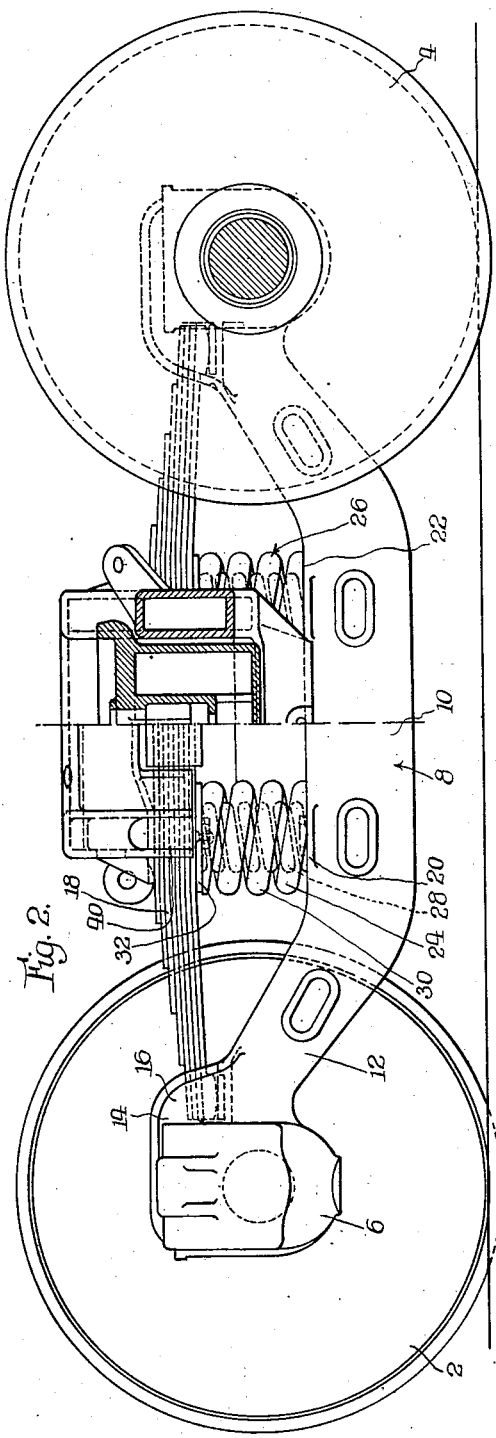
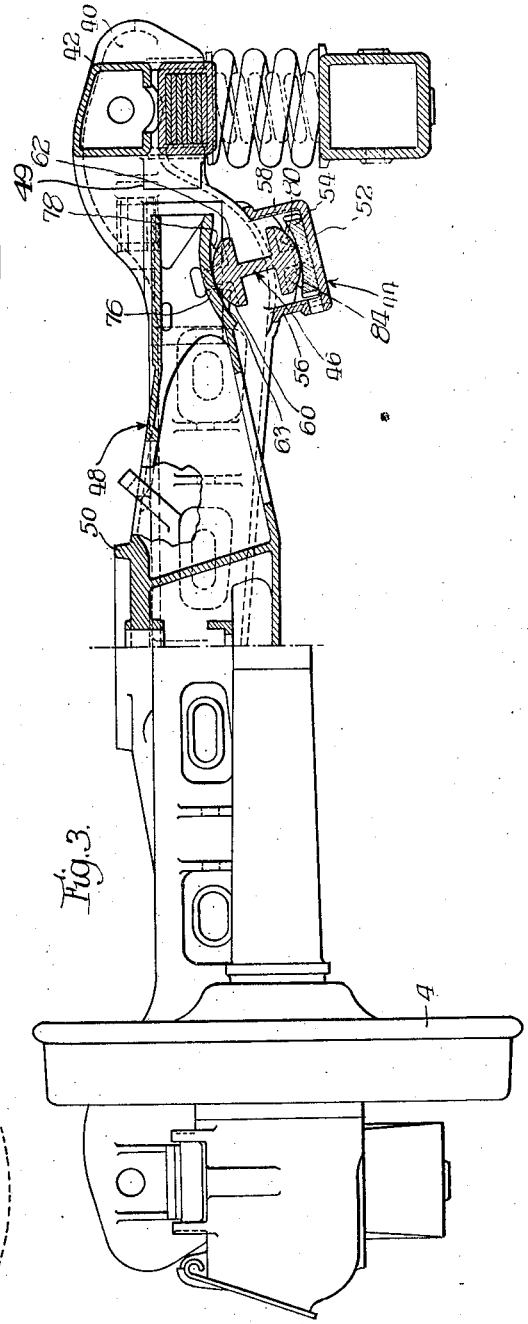
Inventors:
Alfred H. Oelkers,
William C. Hedgcock,
By Wilkinson, Huxley, Byron & Knight
Attys.

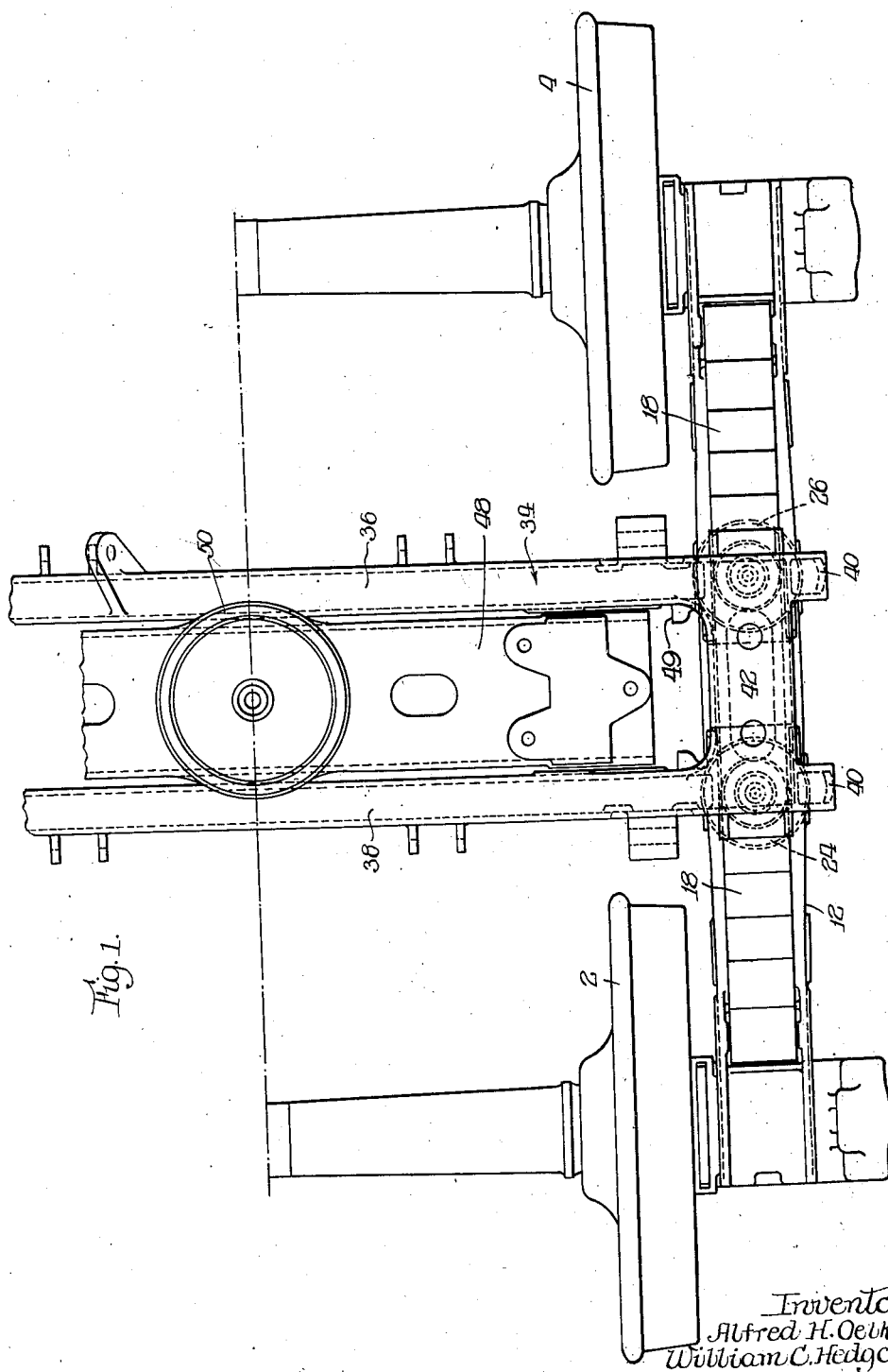

Aug. 18, 1936.  A. H. OELKERS ET AL  2,051,648

TRUCK

Filed Sept. 8, 1931  3 Sheets-Sheet 3

Inventors:
Alfred H. Oelkers,
William C. Hedgcock,
By Wilkinson, Huxley, Byron & Knight
Attys.

Patented Aug. 18, 1936

2,051,648

UNITED STATES PATENT OFFICE 2,051,648

TRUCK

Alfred H. Oelkers, Chicago, and William C. Hedgcock, Wilmette, Ill., assignors to American Steel Foundries, Chicago, Ill., a corporation of New Jersey Application September 8, 1931, Serial No. 561,519

15 Claims. (Cl. 105—192)

The present invention relates to car truck constructions, and more in particular to four-wheel car trucks having a laterally movable bolster in association with flexibly constructed side frames.

Among the objects of the present invention is to provide a car truck construction having flexibly constructed side frames with a laterally movable bolster.

Another object of the present invention is to provide a railway car truck construction in which the side frames thereof include a flexible member for support of a transom or transverse frame member, this transom having means associated therewith for normally mounting a bolster which has lateral movement within certain limits relative to the transom and side frames.

The invention contemplates the idea of mounting the bolster, in a car truck construction of the type indicated, upon rocker members suitably associated with and retained in proper position on the transom member, whereby the bolster has lateral movement relative to the transom, the combination of the laterally movable bolster with the flexibly constructed side frames resulting in an arrangement wherein the riding qualities of the car and lading are enhanced, thus permitting high speed operation without danger of derailment or damage, as likewise a truck which lessens the destructiveness of shocks transmitted to the track, truck parts, or car body.

Another object within the purview of the invention is to provide a novel transom construction adapted to movably support a bolster. The movable supporting means of the present embodiment are rocker elements, the transom having members provided with a bottom web for supporting rocker seats, and side walls which provide pockets for reception of the rocker seats. This arrangement has its advantage in not only providing a strong construction, but also providing a means whereby adjustment may be readily made to the rocker elements. The further advantage of adjustability results because of the fact that shims or other means may be interposed between the removable rocker seats and the bottom web of these supporting members of the transom, whereby the rocker elements may be adjusted relative to the bolster.

The invention still further contemplates the idea of providing these rocker elements, as likewise the bolster and rocker seats associated therewith with cogs, lugs or projecting elements, these elements of each of these members being adapted to be received by a cooperating part for interlocking engagement to properly position the rockers.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a car construction made in accordance with the present invention;

Figure 2 is a side elevation partly in section of a truck construction embodying the invention, the section being taken substantially in the plane longitudinally of the center line of the truck;

Figure 3 is an end elevation partly in section of the truck construction shown in Figures 1 and 2, the section being taken substantially in the plane of the transverse center line of the truck;

Figure 4:
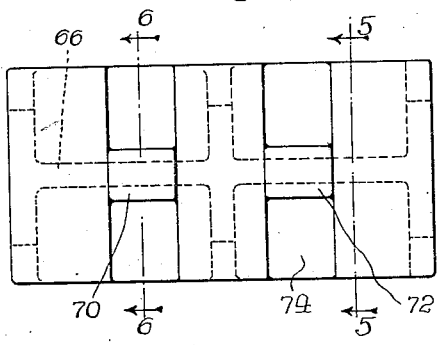
Figure 4 is a top plan view of a rocker member made in accordance with the invention.
Figure 7:
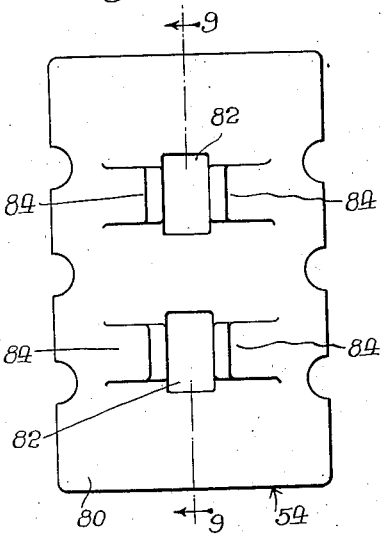
Figure 7 is a top plan view of a rocker seat member made in accordance with the present invention.

Referring now more in detail to the drawings, a car truck construction made in accordance with the present invention is shown as comprising spaced wheel and axle assemblies 2 and 4, each of which is provided with journal boxes 6 adapted to support side members 8 spanning therebetween. Each of these side frame members is of substantially U shaped construction and comprises a lower elongated portion 10 and upwardly inclined end portions 12 terminating in journal box seat portions 14 engaging with or seating upon the journal boxes 6 of the wheel and axle assemblies. Adjacent each of the seating portions 14 is provided a recessed portion 16 adapted to provide a spring seat for the end of a leaf spring assembly 18, while the lower portion 10 is formed to provide spring seats 20 and 22 providing supports in spaced relation for coil spring assemblies 24 and 26. The ends of the leaf spring engaging the spring seats are preferably of arcuate construction whereby deflection due to loading or operation decreases the effective spring length. Each of these coil spring assemblies 24 and 26 comprises an inner and outer coil spring 28 and 30 adapted to have seating relation with the side frame member 8 and also with a spring seat 32 upon which the leaf spring assembly 18 is adapted to be supported adjacent its central portion.

Spanning between the side frames and supported upon the leaf spring assemblies 18 thereof is a transverse member or transom 34. This transom 34 is formed with spaced side portions 36 and 38 provided at their ends with jaws 40 adapted to fit over and engage or embrace portions of the leaf spring assemblies 18, these jaws 40 being interconnected by a transverse member 42. The side portions 36 and 38 are of box-like construction in cross-section and are further connected together adjacent their ends by means of transverse members 44 providing a support for rockers 46 for movably mounting a bolster 48 therebetween for lateral movement relative thereto, this bolster 48 being provided with a center bearing 50 adapted to cooperate with a support of a car body.

The rocker supporting members 44 are preferably formed integral with the side portions 36 and 38 of the transom and are substantially channel-shaped in cross section, the same being formed with a bottom web 52 to provide a support for a rocker seat 54, and side flanges or walls 56 and 58 to provide a pocket for the reception of the rocker 46 which is carried upon the rocker seat 54.

The rockers 46 are formed with curved bearing surfaces 60 adapted to have cooperative seating relation with similar curved bearing surfaces in accordance with the disclosure in a co-pending application Serial No. 552,152, filed July 21, 1931, the contour of these bearing surfaces being such that lines drawn through the points of rocking contact converge upwardly in all positions of lateral motion of the bolster 48 relative to the transom 34 whereby the bolster is self-centering. This causes a certain resistance to too free lateral motion whereby a bolster is normally kept in a central position but permits lateral motion to take place when the lateral forces are sufficient, lateral movement being limited by the stops 49 provided on the transom.

Figure 5:
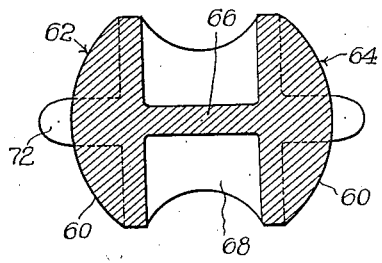
Figure 5 is a view in cross section taken in a plane represented by line 5—5 of Figure 4 of the drawings.
Figure 8:
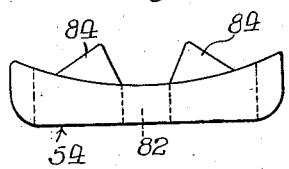
Figure 8 is a view in end elevation of the rocker seat member shown in Figure 7 of the drawings.
Figure 6:
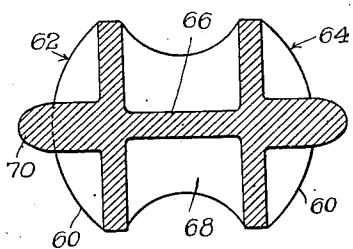
Figure 6 is a view in cross section taken in a plane represented by line 6—6 of Figure 4 of the drawings.
Figure 9:
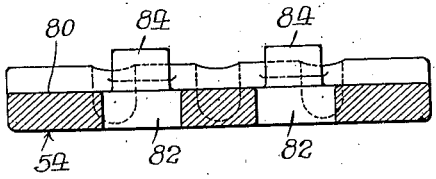
Figure 9 is a view in cross section taken in a plane represented by line 9—9 of Figure 7 of the drawings.

Referring more particularly to Figures 4 to 6 inclusive, these bearing surfaces 60 are shown as being provided on the seating portions 62 and 64 of the rocker. These portions 62 are formed integral with a connecting web 66 and a transverse reinforcing web 68. On each side of the portions 62 and 64 and between the bearing surfaces 60 are provided the projecting elements or cogs 70 and 72 on either side of which are the pockets or recesses 74.

The bearing surfaces 60 of one of the portions 62 are adapted to have cooperative relation with similar curved bearing surfaces 63 provided on the ends of the bolster 48 and the cogs or projections 70 and 72 are adapted to protrude into or be received in openings 76 provided in the bolster and on either side of which are cogs or projections 78 adapted to be received in the recesses 74 of the rocker.

Similarly, the bearing surfaces 60 on the opposite portion 62 are adapted to have cooperative bearing relation with bearing surfaces 80 of the rocker seat member 54, the rocker seat member being further formed with openings 82 between these bearing portions for reception of the cogs or projections 70 and 72 of the rocker, and on either side of which are the cogs or projections 84 adapted to be received in the recesses 74 thereof.

It will be apparent that the cogs or projections provided on the rocker members 46 and interengaging with the cogs or projections provided on the bolster 48 and rocker seats 54 provide an effective means for properly positioning the rockers and to prevent undesired displacement of the same from their proper seating relation with their associated parts. Further, the side walls or flanges 56 and 58 of the supporting members 44 further provide a pocket for the reception of the rocker seats 54, as likewise a strong transom construction. This particular arrangement further includes the distinct advantage of providing means for adjusting the rockers 46, should the same be necessary because of wear. In this respect, shims or other similar members of suitable thickness may be readily inserted between the rocker seats 54 and the web 52 of the supporting members 44 for adjusting the rocker seats 54 with the rockers 46, whereby the rockers have proper seating engagement with the bolster 48.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. A bolster for a car truck, comprising spaced tension and compression members, said tension member having a rocker seat, said seat being provided with an opening, and an element projecting therefrom adapted to interlock with an associated rocker.

2. A bolster for a car truck, comprising spaced tension and compression members, said tension member having a curved rocker seat, said seat being provided with an opening, and an element projecting therefrom adapted to interlock with an associated rocker.

3. A reversible rocker for support of a car truck member, comprising a plurality of similar bearing portions provided with recessed portions.

4. A reversible rocker for support of a car truck member, comprising a plurality of similar bearing surfaces having a recessed portion, and an element projecting from each of said surfaces.

5. A reversible rocker for support of a car truck member, comprising a plurality of similar curved bearing surfaces having recessed portions, and elements projecting from each of said surfaces.

6. A rocker seat member comprising a curved rocker supporting surface, spaced rows of elements projecting therefrom, adapted to interlock with an associated rocker, said member having an opening therein adjacent the base of said elements for receiving another element to interlock said member therewith.

7. A rocker seat member comprising a curved rocker supporting surface, and spaced rows of elements projecting from said surface adapted to interlock with an associated rocker, said member having openings therein adjacent the base of said elements for receiving other projecting elements to interlock said member therewith.

8. In a transom, the combination of spaced members, end connecting members integral therewith, and upwardly extending end portions terminating in downwardly extending jaws forming spaced seats for a common spring, said spaced members being provided with a track for accommodating a rocker.

9. In a transom, the combination of spaced members, end connecting members integral therewith, and upwardly extending end portions terminating in downwardly extending jaws forming spaced seats for a common spring, said spaced members being provided adjacent the end portions with a rocker track.

10. In a transom, the combination of spaced members, end connecting members integral therewith, and upwardly extending end portions terminating in downwardly extending jaws forming spaced seats for a common spring, said spaced members being provided with a connecting channel portion for accommodating a rocker track.

11. In a transom, the combination of spaced members, end connecting members integral therewith, and upwardly extending end portions terminating in downwardly extending jaws forming spaced seats for a common spring, said spaced members being provided with a connecting inwardly facing channel portion for accommodating a rocker track.

12. In a car truck, the combination of spaced wheel and axle assemblies, side frames supported thereon, each of said side frames including a leaf spring, a transom disposed between said leaf springs, said transom including spaced members, end connecting members integral therewith, and upwardly extending end portions terminating in downwardly extending jaws embracing said leaf springs and forming spaced seats for supporting said transom on said leaf springs, said spaced members being provided with tracks for accommodating rockers, rockers on said tracks, and a bolster supported on said rockers.

13. In a car truck, the combination of spaced wheel and axle assemblies, side frames supported thereon, each of said side frames including a leaf spring, a transom disposed between said leaf springs, said transom including spaced members, end connecting members integral therewith, and upwardly extending end portions terminating in downwardly extending jaws embracing said leaf springs and forming spaced seats for supporting said transom on said leaf springs, said spaced members being provided adjacent the end portions with a rocker track, rockers on said tracks, and a bolster supported on said rockers.

14. In a car truck, the combination of spaced wheel and axle assemblies, side frames supported thereon, each of said side frames including a leaf spring, a transom disposed between said leaf springs, said transom including spaced members, end connecting members integral therewith, and upwardly extending end portions terminating in downwardly extending jaws embracing said leaf springs and forming spaced seats for supporting said transom on said leaf springs, said spaced members being provided with connecting channel portions for accommodating rockers, rockers on said portions, and a bolster supported on said rockers.

15. In a car truck, the combination of spaced wheel and axle assemblies, side frames supported thereon, each of said side frames including a leaf spring, a transom disposed between said leaf springs, said transom including spaced members, end connecting members integral therewith, and upwardly extending end portions terminating in downwardly extending jaws embracing said leaf springs and forming spaced seats for supporting said transom on said leaf springs, said spaced members being provided with connecting inwardly facing channel portions for accommodating rockers, rockers on said portions, and a bolster supported on said rockers.

ALFRED H. OELKERS.
WILLIAM C. HEDGCOCK.